United States Patent [19]

Iyoda

[11] Patent Number: 4,710,878

[45] Date of Patent: Dec. 1, 1987

[54] APPARATUS AND A METHOD FOR CONTROLLING WIPER

[75] Inventor: Motomi Iyoda, Toyota, Japan

[73] Assignee: Toyota Jidoshi Kabushiki Kaisha, Aichi, Japan

[21] Appl. No.: 814,801

[22] Filed: Dec. 30, 1985

[30] Foreign Application Priority Data

May 11, 1985 [JP] Japan .............. 60-54226[U]

[51] Int. Cl.$^4$ ............................................. H02P 1/04
[52] U.S. Cl. ................................... 364/424; 318/444;
318/483; 318/DIG. 2; 15/250 C
[58] Field of Search ............... 364/424, 425; 318/443,
318/444, 483, DIG. 2; 15/250 C

[56] References Cited

U.S. PATENT DOCUMENTS

| 4,010,383 | 3/1977 | Grassmann | 318/483 |
|---|---|---|---|
| 4,037,146 | 7/1977 | Kondo | 318/443 |
| 4,107,588 | 8/1978 | Seiler | 318/443 |
| 4,317,073 | 2/1982 | Blaszkowski | 318/483 |
| 4,463,294 | 7/1984 | Gibson | 318/443 |
| 4,499,410 | 2/1985 | Iacoponi et al. | 318/444 |
| 4,527,105 | 7/1985 | Shiraishi | 15/250 C |
| 4,542,325 | 9/1985 | Kobayashi et al. | 318/443 |

FOREIGN PATENT DOCUMENTS 55-120436  9/1981  Japan .

*Primary Examiner*—Gary Chin
*Attorney, Agent, or Firm*—Parkhurst & Oliff

[57] ABSTRACT

The present invention relates to an apparatus and a method for controlling a wiper which detects the amount of rain positioned on a rain sensor regardless of the wiping speed of wipers and which smoothly moves the wipers at different wiping speeds in accordance with the detected amount of rain. The apparatus for controlling the wiper includes the rain sensor, a first comparator, an actuator, a second comparator, a timer, a memory and a changing device. The rain sensor is located on an exterior surface of a front windshield of a vehicle and detects the amount of rain which is positioned on the rain sensor. The wiper wipes off an exterior surface of the front windshield and moves from and returns to an initial position.

20 Claims, 21 Drawing Figures

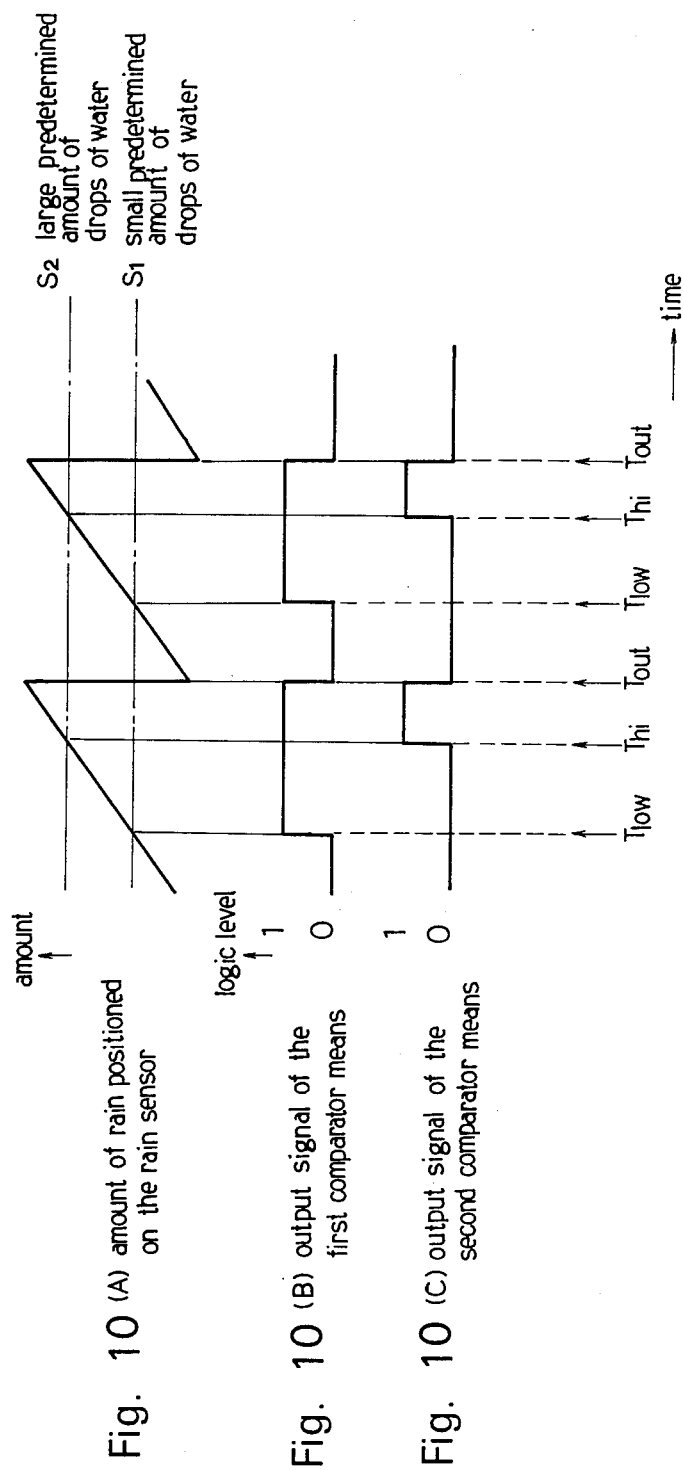

APPARATUS AND A METHOD FOR CONTROLLING WIPER

TECHNICAL FIELD

The present invention relates to an apparatus for controlling a wiper by controlling wiping speed of the wiper in accordance with an amount of rain. More particularly, the present invention relates to improvements in means for controlling the wiper which detects the amount of rain positioned on a detecting means regardless of the wiping speed of the wiper, so that even when the wiper moves at any wiping speed the apparatus according to the present invention can control the wiping speed of the wiper in accordance with the amount of rain positioned on the detecting means.

A conventional wiper of an automobile moves at a low wiping speed or at a high wiping speed and the change of the wiping speeds is operated by manual operation.

However, the manual operation of the conventional wiper is troublesome. Further, when the amount of rain is changeable, an operator must frequently change the wiping speed of the wiper.

DEVELOPMENT OF THE INVENTION BY THE PRESENT INVENTOR

To automatically change the wiping speed of the wiper, an apparatus for controlling a wiper, which is not known by others and has not heretofore been described in any printed publication, has been proposed in private by present inventor. This apparatus includes detecting means for detecting an amount of rain positioned thereon and controlling means for controlling wiping speed of wiper. The detecting means is located on an exterior surface of a windshield of an automobile and the controlling means controls the wiping speed of the wiper in accordance with signal outputted from the detecting means. As shown in FIG. 10(A), the detecting means outputs a continuous signal in accordance with the amount of rain positioned on the detecting means and the controlling means includes first and second comparator means which compares the detected amount of rain positioned on the detecting means with large and small predetermined amounts of drops of water $S_2$ and $S_1$. When the first comparator means determines the detected amount of rain is equal to or greater than the small predetermined amount of drops of water $S_1$, the first controlling means outputs a low actuating signal, which has logic level "1", to an actuator means of the wiper, so that when the detected amount of rain is less than the small predetermined amount of drops of water $S_1$ (i.e., the first controlling means outputs the low actuating signal which has logic level "0".), the wiper is not actuated. On the other hand, if the detected amount of rain is equal to or greater than the small predetermined amount of drops of water $S_1$ (i.e., the first controlling means outputs the low actuating signal which has logic level "1".), the wiper is actuated, as shown in FIG. 10(B).

Further, when the second comparator means determines the detected amount of rain is equal to or greater than the large predetermined amount of drops of water $S_2$, the second controlling means outputs a high actuating signal, which has logic level "1", to the actuator means of the wiper, so that when the detected amount of rain is equal to or greater than the small predetermined amounts of drops of water $S_1$ and less than the larger predetermined amount of drops of water $S_2$, the wiper is driven at a low wiping speed. On the other hand, if the detected amount of rain is equal to or greater than the large predetermined amount of drops of water $S_2$, the wiper is driven at a high wiping speed, as shown in FIG. 10(C). Accordingly, this apparatus can automatically change the wiping speed of the wiper.

However, in this apparatus, as shown in FIGS. 10(A) through 10(C), after the wiper wipes out drops of water positioned on the detecting means at a time $T_{out}$, the amount of drops of water positioned on the detecting means increases gradually. As a result, when the amount of drops of water positioned on the detecting means becomes equal to the small predetermined amount of drops of water $S_1$ at a time $T_{low}$, the wiper starts to move at the low wiping speed and then, when the amount of drops of water positioned on the detecting means becomes equal to the large predetermined amount of drops of water $S_2$ at a time $T_{hi}$, the wiper starts to move at the high wiping speed. Finally, when the wiper wipes out the drops of water positioned on the detecting means the wiper stops its movement. Therefore, when the comparator means determines the detected amount of rain is equal to the large predetermined amount of drops of water $S_2$ during the movement of the wiper at the low wiping speed, the wiper starts to suddenly move at the high wiping speed from the low wiping speed so that the movement of the wiper is not smooth.

To achieve smooth movements of the wiper, another apparatus for controlling the wiper has been proposed in private by present inventor. This another apparatus is not known by others and has not heretofore been described in any publication. This apparatus includes actuator means, comparator means and memory means. The comparator means determines whether the amount of rain positioned on and detected by detecting means is equal to or greater than large or small predetermined amounts of drops of water during a predetermined constant time period after the wiper moves from an initial position. When the comparator means determines the detected amount of rain positioned on the detecting means during the predetermined constant time period after the wiper moves from the initial position is equal to or greater than the large predetermined amount of drops of water, the comparator means outputs a high actuating signal, which has logic level "1". On the other hand, if the comparator means determines the detected amount of rain positioned on the detecting means during the predetermined constant time period after the wiper moves from the initial position is less than the large predetermined amount of drops of water and equal to or greater than the small predetermined amount of drops of water, the comparator means outputs a low actuating signal which has logic level "0".

The memory means memorizes the high or low actuating signal outputted from the comparator means and the memory means outputs the memorized high or low actuating signal to the actuator means at a time when the wiper is positioned at the initial position of the wiper. As a result, the wiping speed of the wiper is changed at the initial position of the wiper in accordance with the memorized high or low actuating signal. Therefore, the wipers of this proposed apparatus can wipe out a windshield smoothly.

However, in this proposed apparatus, the time period defined between a time when the wiper wipes out the detecting means and a time when the wiper returns to the initial position of the wiper depends on the high or low wiping speed of the wiper. Accordingly, when the wiper wipes out the detecting means and returns to the initial position at the high wiping speed and the amount of rain positioned on the detecting means per minute is constant, the time period occurring between the time when the wiper wipes out the detecting means and the time when the wiper returns to the initial position is short and the amount of drops of water positioned on the detecting means is rather small. As a result, the detected amount of rain positioned on the detecting means during the predetermined constant time period after the wiper goes from the initial position of the wiper becomes rather small, and the comparator means may determine the detected amount of rain is less than the large predetermined amount of drops of water and may output the low actuating signal. This occurs even if the actual amount of rain positioned on the detecting means per minute is equal to or more than the large predetermined amount of drops of water per minute.

On the other hand, when the wiper wipes out the detecting means and returns to the initial position at the low wiping speed and the amount of rain positioned on the detecting means per minute is constant, the time period defined between the time when the wiper wipes out the detecting means and the time when the wiper returns to the initial position is long and the amount of drops of water positioned on the detecting means is rather large. As a result, the detected amount of rain positioned on the detecting means during the predetermined constant time period after the wiper goes from the initial position of the wiper becomes rather large, and the comparator means may determine the detected amount of rain is more than large predetermined amount of drops of water and may output the high actuating signal. This occurs even if the actual amount of rain positioned on the detecting means per minute is less than the large predetermined amount of drops of water per minute.

Therefore, in this apparatus, even when the amount of rain positioned on the detecting means per minute is constant, the wiping speed of the wiper is changed to the low or high wiping speed every time when the wiper is positioned on the initial position of the wiper.

SUMMARY OF THE INVENTION

The present invention was developed in view of the foregoing background and to overcome the foregoing drawbacks. It is accordingly an object of this invention to provide an apparatus for controlling a wiper which detects the amount of rain positioned on detecting means regardless of the wiping speed of wiper, and which smoothly moves the wiper at different wiping speeds in accordance with the detected amount of rain.

To achieve a smooth change of a wiping speed of the wiper in accordance with the detected amount of rain, the apparatus for controlling a wiper includes:

detecting means for detecting the amount of rain positioned thereon, first comparator means for comparing the detected amount of rain positioned on the detecting means after the wiper wipes out the detecting means with a small predetermined amount of drops of water and for determining if the detected amount of rain is equal to or greater than the small predetermined amount of drops of water, whereby when the first comparator means determines the detected amount of rain is equal to or greater than the small predetermined amount of drops of water, the first comparator means outputs a first actuating signal.

actuator means for outputting an output signal and for actuating the wiper in accordance with receipt of the first actuating signal outputted from the first comparator means, whereby when the actuator means receives the first actuating signal, the actuator means actuates the wiper at a low wiping speed so that the wiper moves from and returns to an initial position of the wiper at the low wiping speed on a windshield, second comparator means for comparing the detected amount of rain positioned on the detecting means after the wiper wipes out the detecting means with a large predetermined amount of drops of water and for determining if the detected amount of rain is equal to or greater than the large predetermined amount of drops of water, whereby when the second comparator means determines the detected amount of rain is equal to or greater than the large predetermined amount of drops of water, the second comparator means outputs a second actuating signal so that when the wiper is positioned at the initial position and the second comparator means outputs the second actuating signal, the wiper is driven at a high wiping speed, timer means for receiving the output signals outputted from the actuator means and from a changing means, one of the output signals indicating that the wiper was driven at the low wiping speed in accordance with the output signal of the actuator means, another of the output signals indicating that the wiper was driven at the high wiping speed in accordance with the output signal of the changing means, the timer means outputting a clock signal, the clock signal being outputted during a short or long time period after the wiper returns to the initial position of the wiper in accordance with the receipt of the output signals, memory means for memorizing the second output signal outputted from the second comparator means and for outputting the memorized second output signal, and changing means for receiving the logic level "0" or "1" signal outputted from the memory means and for changing the wiping speed of the wiper at the time when the wiper returns to the initial position, in accordance with the memorized second output signal reproduced from the memory means.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements;

FIGS. 10(A)–10(C) are graphs showing relationships of signals of the present inventor's previously proposed apparatus for controlling wipers in relation to an output signal outputted from the rain sensor.

DETAILED DESCRIPTION OF THE PREFERRED EMBODIMENTS

The present invention will be described in detail with reference to the accompanying drawings which illustrate different embodiments according to the present invention.

Figure 1:
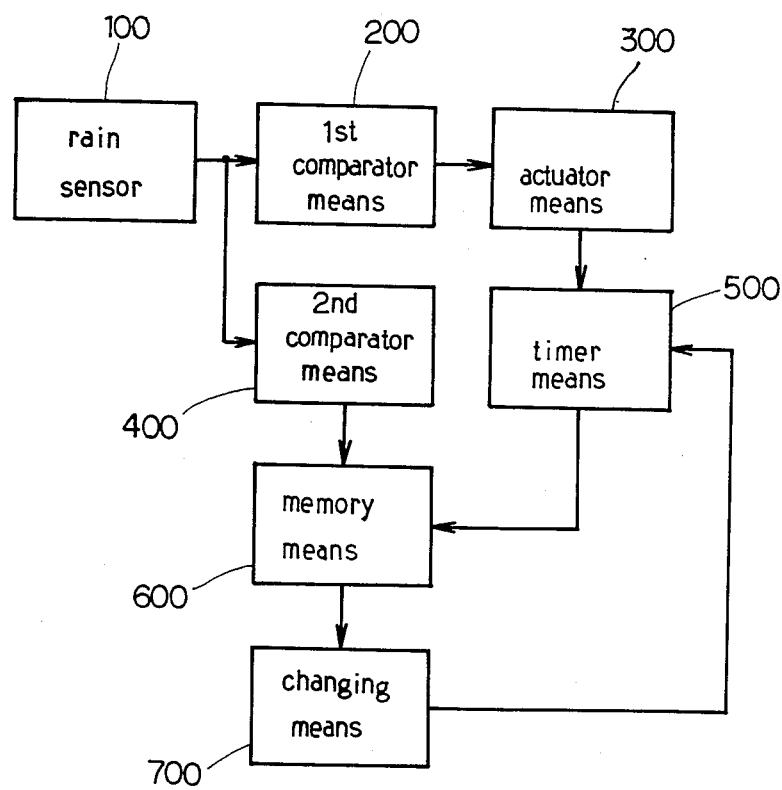
FIG. 1 is a block diagram of the present invention.
Figure 2:
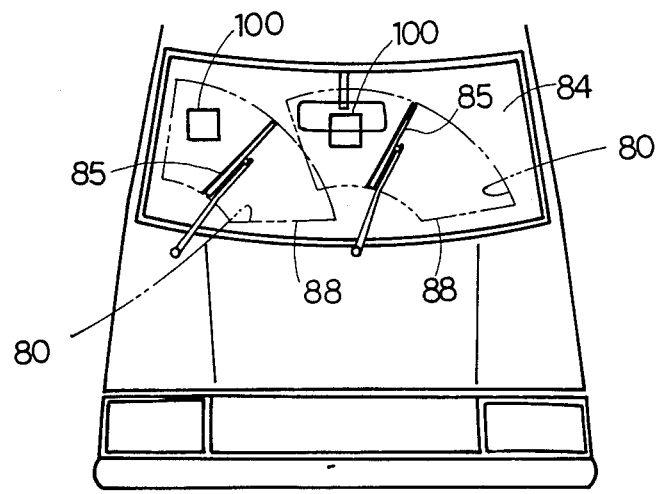
FIG. 2 is a front view of a vehicle which is equipped with an apparatus for controlling wipers according to the present invention.

Referring to FIGS. 1 and 2, an apparatus for controlling a wiper includes a rain sensor 100, first comparator means 200, actuator means 300, second comparator means 400, timer means 500, memory means 600 and changing means 700. The rain sensor 100 is located on an exterior surface of a front windshield 84 of a vehicle and the rain sensor 100 detects amount of rain which is positioned on the rain sensor 100. The rain sensor 100 outputs a continuous signal. The wiper 85 wipes out a wiping area 80 defined on the exterior surface of the front windshield 84 and the wiper 85 moves from and returns to an initial position 88 which is located at the lowest position of the wiping area 80 so that when the wiper 85 stops its movement the wiper 85 is positioned at the initial position 88 and does not present an obstacle which prevents occupants from seeing an outside of the vehicle through the front windshield 84. The rain sensor 100 is located in the vicinity of a change in direction of movements of the wipers 85 within the wiping area 80.

The first comparator means 200 compares the amount of rain detected by the rain sensor 100 and positioned on the rain sensor 100 after the wiper 85 wipes out the rain sensor 100 with small predetermined amounts of drops of water. The first comparator means 200 determines if the detected amount of rain is less or greater than the small predetermined amount of drops of water. When the first comparator means 200 determines the detected amount of rain is equal to or greater than the small predetermined amount of drops of water, the first comparator means 200 outputs a first actuating signal which has a logic level "1". On the other hand, when the first comparator means 200 determines the detected amount of rain is less than the small amount of drops of water, the first comparator means 200 outputs another actuating signal which has a logic level "0".

The actuator means 300 actuates the wipers 85 in accordance with receipt of the logic level "1" first actuating signal outputted from the first comparator means 200. When the actuator means 300 receives the logic level "1" first actuating signal the actuator means 300 moves the wiper 85 at a low wiping speed so that the wiper 85 moves from and returns to the initial position 88 at the low wiping speed on the windshield 84. Further, the actuator means 300 outputs a logic level "1" pulse signal while the wiper 85 completes wiping the area 80.

The second comparator means 400 compares the detected amount of rain with a large predetermined amount of drops of water positioned on the rain sensor 100 after the wiper 85 wipes out the rain sensor 100 and the second comparator means 400 determines whether the detected amount of rain is less or greater than the large predetermined amount of drops of water. When the second comparator means 400 determines the detected amount of rain is equal to or greater than the large amount of drops of water, the second comparator means 400 outputs a second actuating signal which has logic level "1". On the other hand, when the second comparator means 400 determines the detected amount of rain is less than the large amount of drops of water, the second comparator means 400 outputs another actuating sigal which has logic level "0". When the wiper 85 is positioned at the initial position 88 and the changing means 700 receives the logic level "1" second actuating signal reproduced from the memory means 600, the changing means 700 changes the wiping speed from the low wiping speed to a high wiping speed. Further, the changing means 700 outputs a change output signal.

The timer means 500 receives the pulse signal and the change output signal outputted from the actuator means 300 and the changing means 700, respectively. The logic level "1" pulse signal outputted from the actuator means 300 means that the wiper 85 was driven at the low wiping speed, and the logic level "1" change output signal outputted from the changing means 700 means that the wiper 85 was driven at high wiping speed. The timer means 500 outputs a clock signal which has logic level "0" during a long time period "$t_2$" after the wiper 85 returns to the initial position 88 at the high wiping speed, and the timer means 500 outputs a clock signal which has logic level "0" during after a short time period "$t_3$" after the wipers 85 returns to the initial position 88 at the low wiping speed. After the wiper 85 moves from and returns to the initial position 88 at the high wiping speed on the windshield 84, the timer means 500 output the logic level "0" clock signal during a long time period "$t_2$". On the other hand, after the the wiper 85 moves from and returns to the initial position 88 at the low wiping speed on the windshield 84, the timer means 500 outputs the logic level "0" clock signal during a short time period "$t_3$".

The memory means 600 memorizes the second actuating signal reproduces from the second comparator means 400 and the memory means 600 reproduces logic level "1" or "0" second actuating signal at a time when the memory means 600 receives a logic level "1" clock signal outputted from the timer means 500 after either the long or short time period "$t_2$" or "$t_3$" after the wiper 85 returns to the initial position. When the amount of rain positioned on and detected by the rain sensor 100 is equal to or greater than the large predetermined amounts of drops of water, at the time when the memory means 600 receives the logic level "1" clock signal from the timer means 500, the memory means 600 reproduces the logic level "1" second actuating signal. When the amount of rain positioned on and detected by the rain sensor 100 is less than the large predetermined amounts of drops of water and equal to or greater than the small predetermined amount drops of water, at the time when the memory means 600 receives the logic level "0" clock signal from the timer means 500, the memory means 600 reproduces the logic level "0" second actuating signal. (i.e., The memory means 600 outputs either the memorized logic level "1" or logic level "0" second actuating signal the long or short time period after the wiper 85 returns to the initial position 88 of the wiping area 80 in accordance with the clock signal outputted from said timer means.)

The changing means 700 changes the wiping speed of the wipers 85 at the time when the wiper 85 returns to the initial position 88 of the wiping area 80 in accordance with the memorized second output signal reproduced from the memory means. When the changing means 700 outputs the logic level "1" output signal, the wiper 85 moves from and returns to the initial position 88 at the high wiping speed. On the other hand, when the changing means 700 outputs the logic level "0" output signal, the wiper 85 moves from and returns to the initial position 88 at the low wiping speed.

Figure 3:
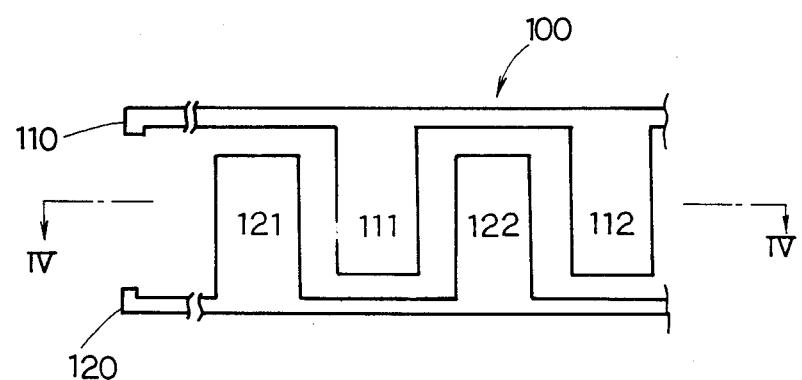
FIG. 3 is an enlarged plan view of a portion of a rain sensor.
Figure 4:
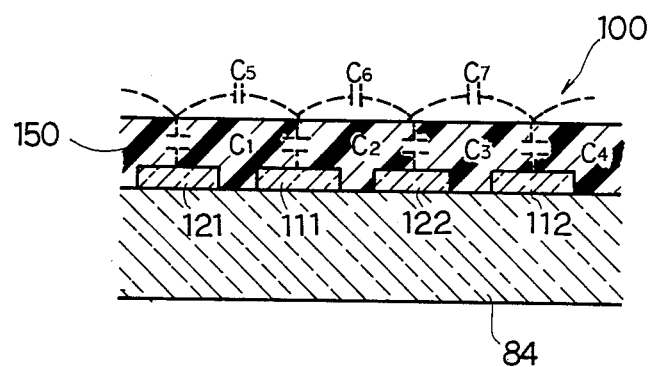
FIG. 4 is an enlarged cross-sectional view of a portion of the rain sensor taken along the line IV—IV in FIG. 3.

FIGS. 3 and 4 show a portion of the rain sensor 100 which is located on the exterior surface of the windshield 84 and is in the vicinity of the change of direction of movement of the wipers 85 within the wiping areas 80. The rain sensor 100 is made of transparent material (e.g. $In_2O_3(Sn)$) so that the occupant can see the outside of the vehicle through the rain sensor 100. The rain sensor 100 has a pair of electrodes 110 and 120. One of the pair of electrodes 110 has a plurality of projections 111, 112 and so on, and an interval is defined between each two of the plurality of projections 111 and 112. Another one of the pair of electrodes 120 has a plurality of projections 121, 122 and so on, and an interval is defined between each two of the plurality of projections 121 and 122. Further, the plurality of projections 111 and 112 of one of electrodes 110 are interleaved into the interval being defined between each two of the projections 121 and 122 of another one of electrodes 120, but a clearance is defined between the plurality of projections 111 and 112 of one of electrodes 110 and the plurality of projections 121 and 122 of another one of electrodes 120. Each of the pair of electrodes 110 and 120 has a thickness of about one micron and each of electrodes 110 and 120 are fixed on the exterior surface of the windshield 84 by evaporation or sputtering.

A protector film 150 covers the electrodes 110 and 120 and the protector film 150 is fixed on the electrodes 110 and 120 and the exterior surface of the windshield 84 by evaporation or sputtering. The protector film 150 is made from transparent material (e.g. $Al_2O_3$) and the protector film 150 has a thickness of about one-fifth micron over the electrodes 110 and 120. The rain sensor 100 has the above mentioned structure so that the rain sensor 100 forms a plurality of floating capacitors $C_1$ through $C_7$ between the electrodes 110 and 120 as shown in FIG. 4.

The floating capacitors $C_1$, $C_5$ and $C_2$ are formed between the projections 121 and 111 of the electrodes 120 and 110, and the floating capacitors $C_2$, $C_6$ and $C_3$ are formed between the projections 111 and 122 of the electrodes 110 and 120, further the floating capacitors $C_3$, $C_7$ and $C_4$ are formed between the projections 122 and 112 of the electrodes 120 and 110.

The floating capacitors $C_5$, $C_6$ and $C_7$ are of variable capacitance, and when a drop of water is positioned on a portion of the protector film 150 defined between the projections 121 and 111 of the electrodes 120 and 110, the capacitance of the floating capacitor $C_5$ becomes more than a normal capacitance of the floating capacitor $C_5$ because the dielectric constant of the drop of water is greater than the dielectric constant of air. Accordingly, when many drops of water are positioned on the protector film 150, a total capacitance formed between the electrodes 110 and 120 becomes larger. Further, the total capacitance is approximately in proportion to the amount of drops of water positioned on the protector film 150.

Figure 5:
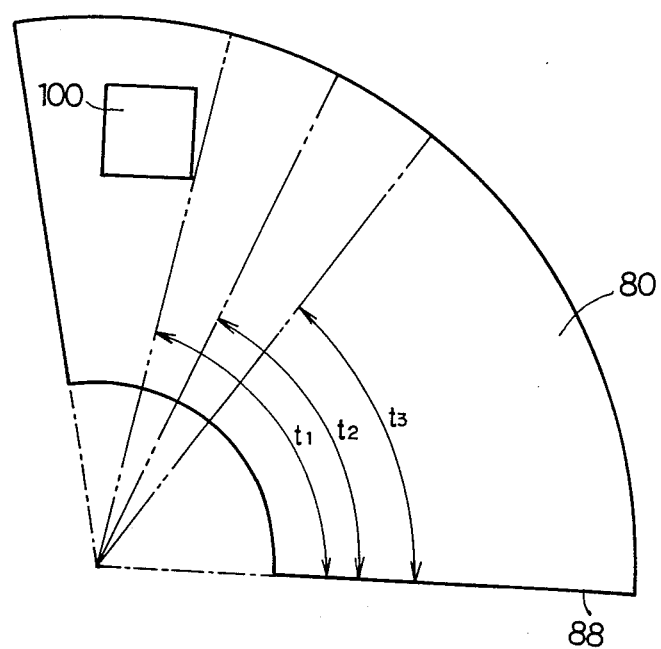
FIG. 5 is an enlarged front view of FIG. 2, wherein the rain sensor is located on an exterior surface of a windshield and within an area where the wiper wipes out.

FIG. 5 shows the enlarged wiping area 80 wherein the rain sensor 100 is located near an apex of the wiping area 80 and numeral 88 indicates the initial position of the wiper 85. Further, "$t_1$" indicates a time period defined between the time when the wiper 85 wipes out the rain sensor 100 and the time when the wiper 85 returns to the initial position 88 of the wiper 85. The wiper 85 can move at the high wiping speed during the long time period "$t_2$" before the timer means 500 outputs the logical level "1" clock signal, and the wiper 85 can move at the low wiping speed during the short time period "$t_3$" before the timer means 500 outputs the logic level "1" clock signal.

Figure 6:
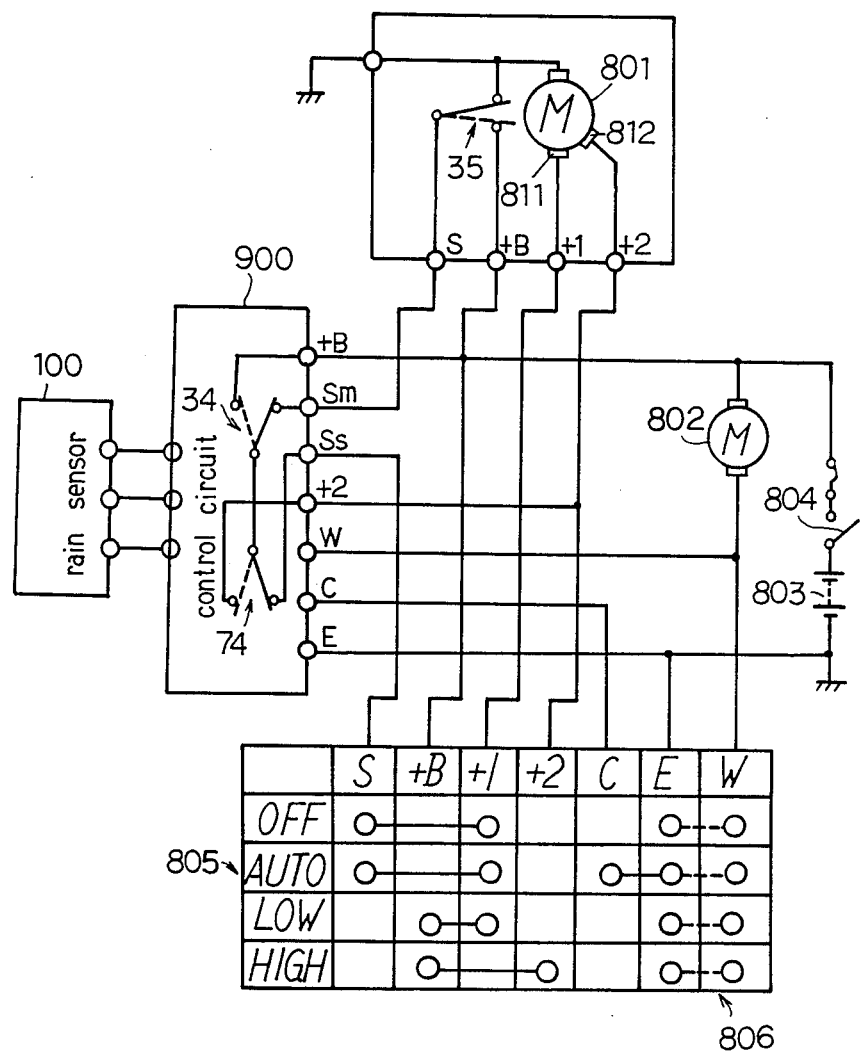
FIG. 6 is a schematic circuit illustrating a first embodiment of the present invention.
Figure 7:
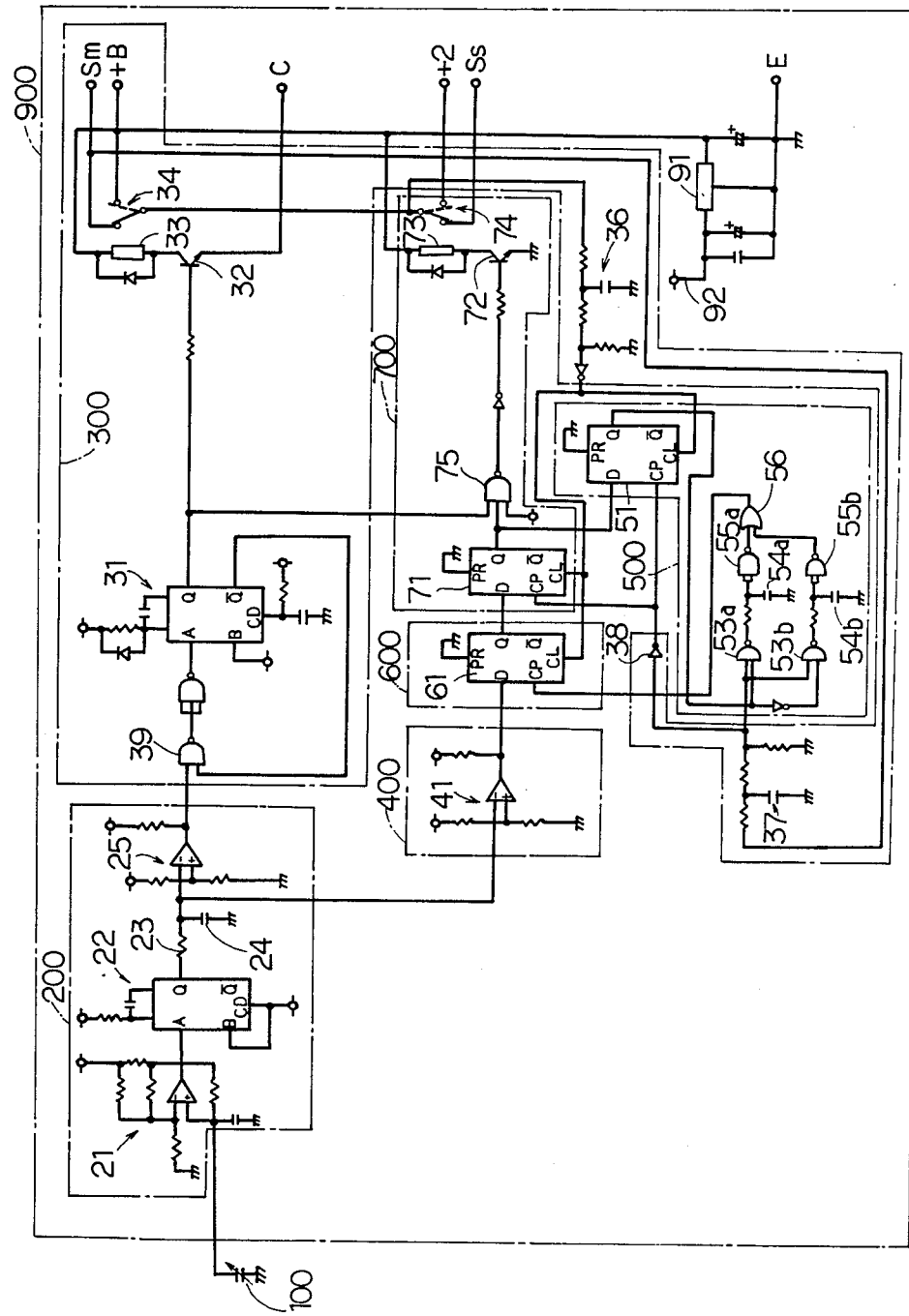
FIG. 7 is a schematic circuit illustrating a control circuit of the first embodiment shown in FIG. 6.
Figure 8:
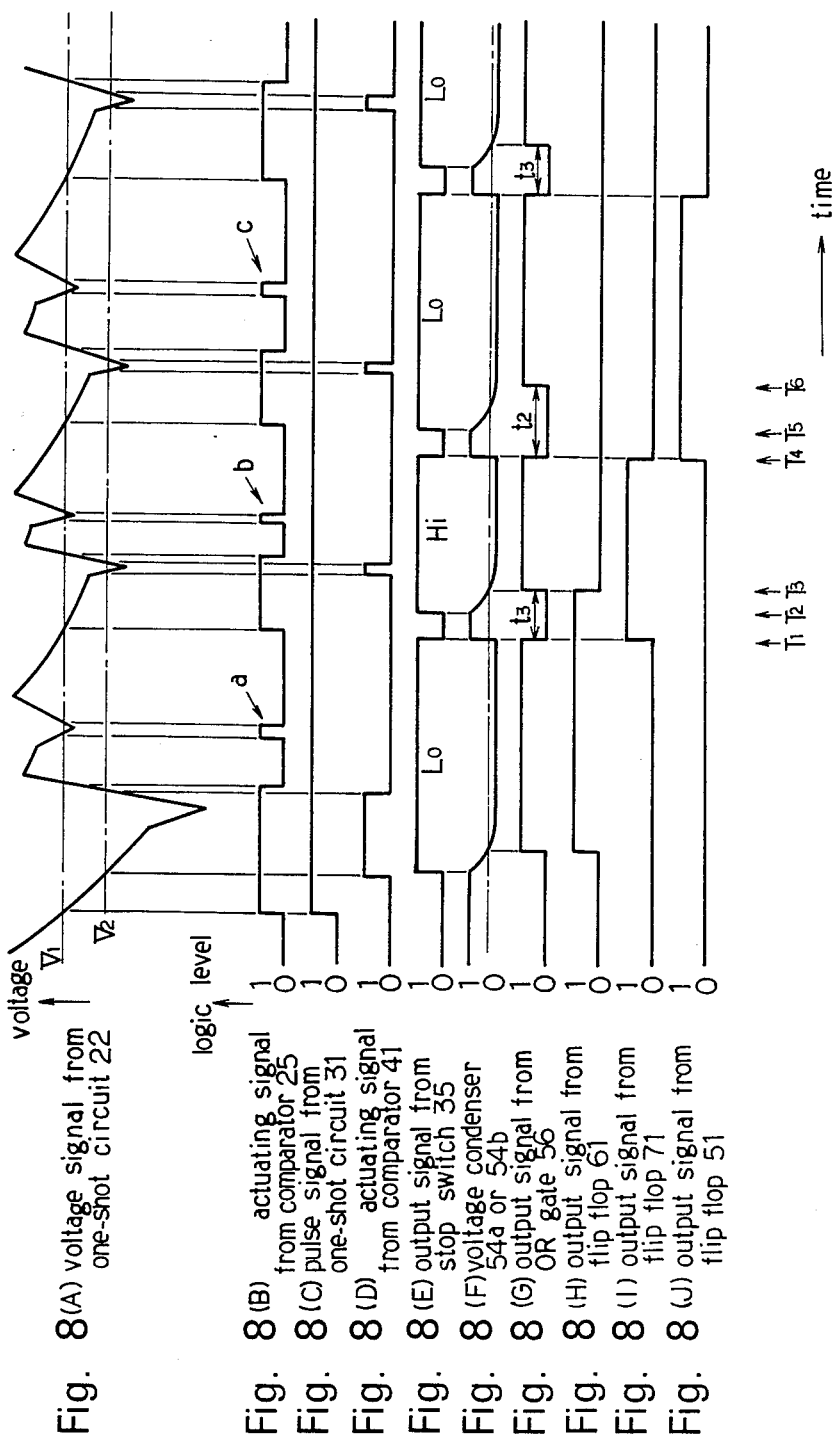
FIGS. 8(A)–8(J) are graphs showing relationships of signals of the first embodiment according to the present invention in relation to an output signal outputted from the rain sensor.

FIGS. 6 and 7 show the circuit of the apparatus for controlling a wiper according to the present invention. Numeral 801 indicates a motor for driving the wiper 85 and numeral 802 indicates another motor for pumping up water and for emitting water from a washer nozzle (not shown in drawings) to the wiping area 80 of the windshield 84. Numeral 805 indicates a wiper switch and numeral 900 indicates a control circuit. The motor 801 is a conventional motor which can drive the wiper 85 at high or flow wiping speed, and the motor 801 includes a stop switch 35. When the wiper 85 is positioned at the initial position 88 of the wiper 85, the stop switch 35 of the motor 801 is positioned at a position which is shown by a solid line in FIG. 6 and stops the movement of the wiper 85. Accordingly, when the wiper 85 is driven by the motor 801 the stop switch 35 is turned to a position which is shown by a phantom line in FIG. 6. The stop switch 35 outputs logic level "1" or "0" signal as shown in FIG. 8(E). The wiper switch 805 includes a low wiping speed switch, a high wiping speed switch, an off switch and an auto wiping speed switch. When the wiper switch 805 is operated by manual operation and selects the low wiping speed switch, the wiper 85 is driven at the low wiping speed. On the other hand, when the wiper switch 805 selects the high wiping speed switch, the wiper 85 is driven at the high wiping speed. In a similar manner, when the wiper switch 805 selects the off switch, the wiper 85 is not driven by the motor 801. Further, if the wiper switch 805 selects the auto switch, the wiper 85 is driven in accordance with the detected amount of rain positioned on the rain sensor 100 after the wiper 85 wipes out the rain sensor 100.

More particularly, when the wiper switch 805 selects the low wiping speed switch, a terminal "+B" is electrically connected to a terminal "+1", as a result, a brush 811 of the motor 801 is connected to a battery 803 through an ignition switch 804, accordingly, the motor 801 is driven at the low speed. When the wiper switch 805 selects the high wiping speed switch, the terminal "+B" is electrically connected to a terminal "+2", as a result, another brush 812 of the motor 801 is connected to the battery 803 through the ignition switch 804, accordingly, the motor 801 is driven at the high speed. When the wiper switch 805 selects the off switch, a terminal "S" is electrically connected to the terminal "+1", as a result, a moveable contact of the stop switch 35 is connected to the brush 811 of the motor 801, through a first switch 34 and a second switch 74 of a control circuit 900. The first and second switches 34 and 74 are normally connected respectively to non-moveable contacts "$S_m$" and "$S_s$", as shown by the solid line in FIG. 6. When a first relay 33 is actuated, the first switch 34 is turned and connected to a non-moveable contact "+B" as shown by a phantom line in FIGS. 6 and 7, as a result, the brush 811 of the motor 801 is connected to the battery 803 through the terminals "+1" and "S" of the wiper switch 805 and the first and second switches 74 and 34 of the control circuit 900. In the same manner, when a second relay 73 is actuated, the second switch 74 is turned and connected to a non-moveable "+2" as shown by a phantom line in FIGS. 6 and 7, as a result, the another brush 812 of the motor 801 is connected to the battery 803 through the first and second switches 74 and 34 of the control circuit 900.

When the wiper switch 805 selects the auto wiping switch, the terminal "S" is electrically connected to the terminal "+1" and a terminal "C" is electrically connected to a terminal "E". As a result, a non-moveable contact "C" of the control circuit 900 is connected to the ground and then the control circuit 900 is connected to the battery 803.

Further, the wiper switch 805 includes a washer switch 806. When the washer switch 806 is turned on, the terminal "E" is electrically connected to a terminal "W" independent of selection of the wiper switch 805, as a result, the another motor 802 is electrically connected to the battery 803 through the ignition switch 804 and the terminal "W" is connected to the ground. Further, the control circuit 900 is electrically connected to the rain sensor 100.

When the motor 801 is driven at high or low speed, a movable contact of the stop switch 35 is contacted to non-moveable contact "+B" as shown by the phantom line in FIG. 6. In this condition, the stop switch 35 outputs the logic level "1" signal, as shown in FIG. 8(E). Accordingly, even when the wiper switch 805 is operated to select the off switch during the movement of the motor 801, the motor 801 is continuously driven at the low speed unless the wiper 85 returns to the initial position 88 of the wiper 85, because the brush 811 of the motor 801 is connected to the battery 803 through the terminals "+1" and "S", the first and second switches 34 and 74 of the control circuit 900, the stop switch 35 and the ignition switch 804. When the wiper 85 returns to the initial position 88 of the wiper 85 and the moveable contact of the stop switch 35 is turned as shown by the solid line in FIG. 6, the movement of the motor 801 is stopped. In this condition, the stop switch 35 outputs the logic level "0" signal, as shown in FIG. 8(E).

When the wiper switch 805 selects the auto wiping switch, the control circuit 900 receives signals detected by the rain sensor 100 being in proportion to the amount of rain, which is positioned on the rain sensor 100 after the wiper 85 wipes out the rain sensor 100. When the detected amount of rain is equal to or greater than the small predetermined amount of drops of water, the first switch 34 of the control circuit 900 is turned as shown by the phantom line in FIGS. 6 and 7 during a certain time, as a result, the motor 801 is driven at the low speed and the wiper 85 moves from the initial position 88 of the wiper 85 to an intermediate portion of the wiping area 80. Even if the first switch 34 returns to a previous position shown by the solid line in FIGS. 6 and 7 after the certain time has passed, the motor 801 is continuously driven at the low speed unless the wiper 85 moves to the apex of the wiping area 80 and returns to the initial position 88 of the wiper 85, because the brush 811 of the motor 801 is connected to the battery 803 through the terminals "+1" and "S", the first and second switches 34 and 74, the stop switch 35 and the ignition switch 84.

In this condition (i.e. the wiper switch 805 selects the auto wiping switch) when the detected amount of rain becomes equal to or greater than the large predetermined amount of drops of water, the first and second switch 34 and 74 of the control circuit 900 are turned as shown by the phantom line in FIGS. 6 and 7, as a result, the motor 801 is driven at the high speed.

As shown in FIG. 7, the control circuit 900 includes, the first comparator means 200, the actuator means 300, the second comparator means 400, the timer means 500, the memory means 600 and the changing means 700. The first comparator means 200 is electrically connected to the rain sensor 100, the actuator means 300 and the second comparator means 400. When the first comparator means 200 compares the amount of rain detected by the rain sensor 100 with the small predetermined amount of drops of water and determines the detected amount of rain is equal to or greater than the small predetermined amount of drops of water, the first comparator means 200 outputs the first actuating signal, which has a logic level "1", to the actuator means 300. The first comparator means 200 includes an oscillator 21, one-shot circuit 22, a resistor 23, a condenser 24 and a comparator 25. The oscillator 21 is of a conventional resistor-condenser negative feedback type-oscillator which includes an operational amplifier as outputting means of the oscillator. The oscillator 21 is connected to the rain sensor 100. When the rain sensor 100 varies its variable capacitance in proportion to amount of rain positioned on the rain sensor 100, the oscillator 21 outputs a frequency which varies in inverse proportion to amount of rain positioned on the rain sensor 100. The one-shot circuit 22 receives the output frequency and outputs a signal which has the same period as a period of the output frequency and which has a constant width in spite of the magnitude of the output frequency. An integration circuit, which consists of the resistor 23 and the condenser 24, receives the signal outputted from the one-shot circuit 22 and the integration circuit outputs voltage signal being in proportion to the output frequency outputted from the oscillator 21. Accordingly, the voltage signal is in inverse proportion to the detected amount of rain, as shown in FIG. 8(A). The comparator 25 receives the voltage signal and the comparator 25 compares the value of the voltage signal with a first predetermined value of voltage "$V_1$". When the comparator 25 determines the value of the voltage signal is equal to or less than the first predetermined value of voltage "$V_1$", the comparator 25 outputs the first actuating signal which has logic level "1", as shown in FIG. 8(B). The first predetermined value of voltage "$V_1$" corresponds to the small predetermined amount of drops of water. On the other hand, when the comparator 25 determines the value of the voltage signal is greater than the first predetermined value of voltage "$V_1$", the comparator 25 output the another actuating signal which has logic level "0". Namely, only when the comparator means 200 determines the detected amount of rain is equal to or greater than the small predetermined amount of drops water, the comparator means 200 outputs the logic level "1" first actuating signal.

When the actuator means 300 receives the logic level "1" first actuating signal from the comparator means 200, the actuator means 300 has the movable contact of the first switch 34 turn from the position shown by the solid line to the position shown by the phantom line in FIG. 7 and maintains the moveable contact of the first switch 34 at the phantom line position during the certain time period. The actuator means 300 includes one-shot circuit 31, a NAND gate 39, a switching transistor 32, the first relay 33 and the first switch 34. When the one-shot circuit 31 receives the logic level "1" first actuating signal through the NAND gate 39, a terminal "Q" of the one-shot circuit 31 outputs a pulse signal which has logic level "1" during the certain time period, as shown in FIG. 8(C). When the switching transistor 82 receives the logic level "1" pulse signal from the one-shot circuit 31, the switching transistor 82 allows electric current to pass therethrough. As a result, the first relay 33 is actuated and the first switch 34 is turned from the solid line position to the phantom line position as shown in FIG. 7. Accordingly, when the wiper switch 805 selects the auto wiping switch, the brush 811 of the motor 801 is connected to the battery 803 through the terminals "+1" and "S" of the wiper switch 805, the second and first switches 74 and 34, and the ignition switch 804, as a result, the wiper 85 moves at the low wiping speed.

Further, the certain time period, during which the one-shot circuit 31 outputs pulse signal, is longer than a time period defined between a time when the motor 801 is actuated (i.e. the wiper 85 starts moving from the initial position 88 of the wiper 85) and a time when the stop switch 35 is turned from the solid line position to the phantom line position, as shown in FIG. 6. The NAND gate 39 receives a feedback signal outputted from the one-shot circuit 31 during the certain time period, as a result, a further logic level "1" first actuating signal is not inputted from the first comparator means 200 to the one-shot circuit 31 of the actuator means 300 during the certain time period. Namely, when the one-shot circuit 31 outputs the logic level "1" pulse signal during the certain time period, the one-shot circuit 31 also outputs the feedback signal to the NAND gate 39. As a result, the NAND gate 39 outputs a signal to the one-shot circuit 31 regardless of the logic level "1" first signal outputted from the first comparator means 200.

Further, when the wiper 85 wipes out greater than small predetermined amount of drops of water from the rain sensor 100 the comparator 25 outputs the logic level "1" first actuating signals as shown by a, b, c in FIG. 8(B). However, when the one-shot circuit 31 outputs the further logic level "1" pulse signal during certain period, the one-shot circuit 31 does not receive the logic level "1" first actuating signal from the first comparator means 200 even when greater than the small predetermined amount of drops of water is present on the rain sensor 100 with the wiper 85.

Accordingly, when the wiper 85 moves from the initial position 88 of the wiper 85 and greater than small predetermined amount of drops of water is present on the rain sensor 100 with the wiper 85, the comparator 25 of the first comparator means 200 outputs the logic level "1" first actuating signal but the one-shot circuit 31 does not output any logic level "1" pulse signal again during the certain time period. As a result, when the wiper 85 goes from and returns to the initial position of the wipers 85 only once (i.e., in the apparatus according to the present invention, the wiper 85 wipes out the rain sensor 100 twice during the certain time period.), the one-shot circuit 31 outputs only one of the logic level "1" pulse signal. However, when the wiper 85 is continuously actuated, as shown in FIG. 8(C), the one-shot circuit 31 outputs continuously the logic level "1" pulse signal.

Further, the actuator means 300 includes a clear circuit 36 and a low pass filter 37. The clear circuit 36 outputs a clear signal when the first switch 34 is positioned as shown by the solid line in FIGS. 6 and 7 and the stop switch 35 is positioned as shown by the solid line in FIG. 6. The clear circuit 36 includes a low pass filter and an inverter and the clear signal outputted from the clear circuit 36 is inputted into each terminals "CL" of delay type flip flops (i.e., delay type bistable multivibrators) 51, 61 and 71, as a result, the delay type flip flops 51, 61 and 71 are cleared. In addition, the low pass filter 37 prevents the signal of the stop switch 35 from chattering. The signal outputted from the low pass filter 37 is inputted into the timer means 500 and the signal from the low pass filter 37 is concurrently inverted by an inverter 38 and then is inputted into terminals "CP" of the delay type flip-flops 51 and 71.

Furthermore, the voltage signal outputted from the condenser 24 of the first comparator means 200 is inputted into the second comparator means 400. The second comparator means 400 includes a comparator 41 which outputs the second actuating signal which has logic level "1", when the comparator 41 determines the voltage signal outputted from the condenser 24 is equal to or less than a second predetermined value of voltage "$V_2$", as shown in FIG. 8(D). (i.e., When the comparator means 400 determines the detected amount of rain is equal to or greater than the large predetermined amount of drops of water, the comparator means 400 outputs the second actuating signal which has logic level "1").

The memory means 600 includes the delay type flip flop 61 and the logic level "1" second actuating signal is inputted into a terminal "D" of the flip-flop 61 of the memory means 600. When a terminal "CP" of the flip-flop 61 receives the clock signal which has logic level "1" and the logic level "1" second actuating signal is inputted in the terminal "D" of the flip-flop 61 of the memory means 600, the flip-flop 61 outputs an output signal, which has logic level "1", from a terminal "Q" thereof.

The changing means 700 includes the delay type flip-flop 71, a NAND gate 75, a switching transistor 72, the second relay 73 and the second switch 74. A terminal "D" of the flip-flop 71 receives the output signal outputted from the flip-flop 61 of the memory means 600. When a terminal "CP" of the flip-flop 71 receives the signal, which has logic level "1", from the low pass filter 37 through the inverter 38, the flip-flop 71 memorizes the output signal outputted from the flip-flop 61 and outputs the change output signal, which has logic level "1", from a terminal "Q" of the flip-flop 71. When the NAND gate 75 receives both the logic level "1" signal outputted from the flip-flop 71 and the logic level "1" change output signal outputted from the one-shot circuit 31, the logic level "1" change output signal outputted from the flip-flop 71 is inputted to the switching transistor 72 through the NAND gate 75, as a result, the electric current passes through the switching transistor 72 and the second relay 73 is actuated. Accordingly, the second switch 74 is turned from the position shown by the solid line to the position shown by the phantom line in FIG. 7.

As shown in FIG. 6, when the first switch 34 and the second switch 74 are turned to the position shown by the phantom line, the battery 83 is connected to the another brush 812 of the motor 801 through the ignition switch 804, the first and second switches 34 and 74, as a result, the motor 801 is driven at the high speed.

On the other hand, if the NAND gate 75 does not receive both the signals outputted from the flip-flop 71 and the one-shot circuit 31, the NAND gate 75 closes and the switching transistor 72 does not receive any signal.

Accordingly, when the vehicle goes into a tunnel or the like and the rain sensor 100 does not detect any rain thereon, the one-shot circuit 31 of the actuator means 300 does not output the signal which has logic level "1". As a result, the switching transistors 32 and 72 do not receive any signal and do not pass the electric current therethrough and then the first and second relays 33 and 73 are deactivated. The first and second switches 34 and 74 are turned from the position shown by the phantom line to the position shown by the solid line is FIGS. 6 and 7. Therefore, the battery 803 is connected to the brush 811 of the motor 801 through the ignition switch 804, the stop switch 35 whose moveable contact is positioned in the position shown by the phantom line in FIG. 6, the first and second switches 34 and 74 and the terminals "S" and "+1" of the wiper switch 805, as a result, the motor 801 is driven at the low speed unless the moveable contact of the stop switch 35 is turned from the position shown by the phantom line to the position shown by the solid line in FIG. 6. (i.e., The wiper 85 is driven at the low wiping speed until the wiper 85 returns to the initial position 88 of the wiper 85.)

The timer means 500 outputs a clock signal, which has logic level "0", during the long or short time period "$t_2$" or "$t_3$" after the wiper 85 returns to the initial position 88. When the wiper 85 was driven previously at the high wiping speed, the time means 500 outputs the logic level "0" clock signal during the long time period "$t_2$" after the wiper 85 returns to the initial position 88. On the other hand, the wiper 85 was driven previously at the low wiping speed, the timer means 500 outputs the logic level "0" clock signal during the short time period "$t_3$" after the wiper 85 returns to the initial position 88. Further, the time period "$t_1$", which is defined between the time when the wiper 85 wipes out the rain sensor 100 and the time when the wiper 85 reaches to the initial position 88 of the wiper 85, shown in FIG. 5 depends on the low or high wiping speed (e.g., when the wiper 85 is driven at the high wiping speed, the time period "$t_{1(hi)}$" is rather short, on the other hand, if the wiper 85 is driven at the low wiping speed, the time period "$t_{1(low)}$" is rather long).

To detect the amount of rain positioned on the rain sensor 100 during a predetermined constant time period regardless of the different wiping speed, and to compare the detected amount of rain with the large predetermined amount of drops of water, a time period "$t_{1(hi)}$"+"$t_2$" and a time period "$t_{1(low)}$"+"$t_3$" are determined to be the substantially same as the predetermined constant time period.

Therefore, the flip-flop 61 of the memory means 600 memorizes the logic level "1" second actuating signal outputted from the second comparator means 400 and reproduces the memorized second output signal when the predetermined constant time period has passed after the wiper 85 had wiped out the rain sensor 100. For example, when the wiper 85 had wiped out the rain sensor 100 at the high wiping speed and when the second comparator means 400 determines the detected amount of rain during the predetermined constant time period after the wiper 85 wipes out the rain sensor 100 is equal to or greater than the large predetermined amount of drops of water, the memory means 600 reproduces the logic level "1" memorized second actuating signal at the time when the time period "$t_{1(hi)}$"+"$t_2$" has passed after the wiper 85 had wiped out the rain sensor 100. On the other hand, if the wiper 85 had wiped out the rain sensor 100 at the low wiping speed and if the second comparator means 400 determines the detected amount of rain during the predetermined constant time period after the wiper 85 wipes out the rain sensor 100 is equal to or greater than the large predetermined amount of drops of water, the memory means 600 reproduces the logic level "1" memorized second actuating signal at the time when the time period "$t_{1(Lo)}$"+"$t_3$" has passed after the wiper 85 had wiped out the rain sensor 100.

The timer means 500 includes the delay type flip-flop 51, NAND gates 53a and 53b, condensers 54a and 54b, inverters 55a and 55b and an OR gate 56. The delay type flip-flop 51 memorizes either the logic level "1" or logic level "0" change output signal which is outputted from the "Q" terminal of the flip-flop 71 of the changing means 700 and outputs logic level "1" or logic level "0" signal to the NAND gates 53a and 53b at the time the moveable contact of the stop switch 35 is turned to the solid line position shown in FIG. 6, (i.e. when the wiper 85 returns to the initial position 88). When the memorized signal has logic level "1", the NAND gate 53a opens and the NAND gate 53b closes. On the other hand, when the memorized signal has logic level "0", the NAND gate 53a closes and the NAND gate 53b opens. Concurrently, the signal is inputted from the low pass filter 37 to the NAND gates 53a and 53b. The condenser 54a and the inverter 55a are connected to the output side of the NAND gate 53a and the NAND gate 53a, the condenser 54a and the inverter 55a produce the long time period signal "$t_2$" which has logic level "0". On the other hand, the condenser 54b and the inverter 55b are connected to the output side of the NAND gate 53b and the NAND gate 53b, the condenser 54b and the inverter 55b produce the short time period signal "$t_3$" which has logic level "0". The signals outputted from the inverter 55a or 55b are inputted to the OR gate 56 and a terminal "CP" of the flip-flop 61.

Accordingly, when the wiper 85 moves from the initial position 88 of the wiper 85 and logic level "1" signal outputted from the stop switch 35, which is shown in FIG. 8(E), is inputted to either NAND gate 53a or 53b through the low pass filter 37, either condenser 54a or 54b discharges, as shown in FIG. 8(F), in accordance with the logic level of the output signal from the flip-flop 51. More particularly, while the flip-flop 51 outputs the output signal which has the logic level "0", the condenser 54b starts to discharge at a time when the logic level "1" output signal is outputted from the stop switch 35 through the low pass filter 37, (i.e., the stop switch 35 is turned from the position shown by the solid line to the position shown by the phantom line in FIG. 6), and the condenser 54b discharges after the logic level "1" output signal is outputted from the stop switch 35. Accordingly, the inverter 55b outputs a signal, which has logic level "1", to a terminal "CP" of the flip-flop 61 through the OR gate 56 at the short time period "$t_3$" after the wiper 85 returns to the initial position 88 of the wiper 85, as shown in FIG. 8(G).

On the other hand, while the flip-flop 51 outputs the output signal which has the logic level "1", the condenser 54a starts to discharge at a time when the logic level "1" output signal is outputted from the stop switch 35 through the low pass filter 37, and the condenser 54a discharges after the logic level "1" output signal is outputted from the stop switch 35. Accordingly, the inverter 55a outputs a signal, which has logic level "1" to the terminal "CP" of the flip-flop 61 through the OR gate 56 at the long time period "$t_2$" after the wiper 85 returns to the initial position 88 of the wiper 85, as shown in FIG. 8(G).

In FIG. 7, numeral 91 indicates a voltage regulator which is connected between terminals "+B" and "E" of the control circuit 900. When the ignition switch 804 is turned on and the voltage of the battery 803 is applied between the terminals "+B" and "E" of the control circuit 900, an output terminal 92 outputs a constant voltage (i.e., 5 V) which is supplied to all means of the control circuit 900.

Further, the control circuit 900 includes a delay circuit (not shown in drawings) which supplies the current to the first relay 33 a few seconds after the washer switch 806 is turned on. As a result, the first switch 34 is turned from the position shown by the solid line to the position shown by the phantom line in FIG. 7 and then the brush 811 of the motor 801 is connected to the battery 803 through the ignition switch 84, the first and second switch 37 and 74 and the terminals "S" and "+1" of the wiper switch 805.

In the operation of the apparatus for controlling wiper, when the ignition switch 804 is turned on and the voltage regulator 91 supplies the constant voltage to all means of the control circuit 900, and if the wiper switch 805 selects the AUTO switch, the apparatus for controlling the wiper assumes the automatic operation condition. In the automatic operation condition, when the rain sensor 100 detects equal to or greater than the small predetermined amount of drops of water, the comparator 25 of the first comparator means 200 outputs the logic level "1" first actuating signal to the actuator means 300, accordingly, the one-shot circuit 31 of the actuator means 300 outputs the pulse signal to the switching transistor 32 and the moveable contact of the first switch 34 is turned by the first relay 33 to the position shown by the phantom line in FIGS. 6 and 7. As a result, the brush 811 of the motor 801 is connected to the battery 803 through the terminals "S" and "+1" of the wiper switch 805 and the first and second switches 34 and 74 of the control circuit 900 and the ignition switch 804 and the motor 801 is driven at the low wiping speed.

Further, when the rain sensor 100 detects equal to or greater than the large predetermined amount of drops of water, the comparator 41 of the second comparator means 400 outputs the logic level "1" second actuating signal to the memory means 600. The memory means 600 memorizes the logic level "1" second actuating signal and then the flip-flop 61 of the memory means 600 outputs the logic level "1" or logic level "0" actuating signal to the flip-flop 71 of the changing means 700 at the long or short time period "$t_2$" or "$t_3$" after the wiper 85 returns to the initial position 88 of the wiper 85. (i.e., When the wiper 85 returns to the initial position 88 at the high wiping speed, the memory means 600 outputs the logic level "1" or logic level "0" actuating signal at the long time period "$t_2$" after the wiper 85 returns to the initial position 88. On the other hand, when the wiper 85 returns to the initial position 88 at the low wiping speed, the memory means 600 outputs the logic level "1" or "0" actuating signal at the short time period "$t_3$" after the wiper 85 returns to the initial position 88.)

Further, when the flip-flop 71 memorizes the logic level "1" actuating signal and then the flip-flop 71 outputs the logic level "1" signal at the time when the wiper 85 returns to the initial position 88 (i.e., the stop switch 35 is turned from the position shown by the phantom line to the position shown by the solid line in FIG. 6), the motor 801 has the wiper 85 move from and return to the initial position 88 at the high wiping speed.

Furthermore, when the wiper 85 moves from the initial position 88 at the low wiping speed, the flip-flop 71 of the changing means 700 memorizes a signal which has logic level "0".

Accordingly, when the wiper 85 returns to the initial position 88 at a time "$T_1$" as shown in FIGS. 8(A) through 8(J), the flip-flop 51 of the timer means 500 memorizes and outputs another actuating signal which has logic level "0". Then, when the stop switch 35 is turned from the position shown by the solid line to the position shown by the phantom line in FIG. 6 at a time "$T_2$", the condenser 54b of the timer means 500 discharges. A short time period after the condenser 54b discharges (i.e., at a time "$T_3$"), the inverter 55b outputs the logic level "1" clock signal to the terminal "CP" of the flip-flop 61 through the OR gate 56, as a result, the flip-flop 61 of the memory means 600 reproduces the logic level "0" second actuating signal outputted from the comparator 41 of the second comparator means 400 at the time "$T_3$". (i.e., When the comparator 41 of the second comparator means 400 outputs the second actuating signal, which has logic level "0", at the time "$T_3$", the flip-flop 61 reproduces the logic level "0" second actuating signal.) When the wiper 85 returns to the initial position 88 at a time "$T_4$", the flip-flop 71 of the changing means 700 outputs the logic level "0" change output signal outputted from the flip-flop 61 and memorized in the flip-flop 71, concurrently, the flip-flop 51 of the timer means 500 outputs the logic level "1" signal outputted from the flip-flop 71. As a result, the wiping speed of the motor 801 is changed from the high wiping speed to the low wiping speed, and then when the stop switch 35 is turned from the position shown by the solid line to the position shown by the phantom line at a time "$T_5$", the condenser 54a of the timer means 500 discharges. A rather long time after the condenser 54a discharged (e.g., at a time "$T_6$"), the inverter 55a outputs the clock signal to the terminal "CP" of the flip-fllp 61 of the memory means 600 through the OR gate 56.

Thus, the time period "$t_2$" or "$t_3$", defined between the time when the wiper 85 returns to the initial position 88 and the time when the flip-flop 61 of the memory means 600 outputs the signal depends on the wiping speed at which the wiper 85 has wiped out on the wiping area 80 of the windshield 84. (i.e., When the wiper 85 has wiped out the windshield 84 at the high wiping speed and when the second comparator 400 outputs the logic level "0" second actuating signal, the flip-flop 61 of the memory means 600 outputs the logic level "0" signal the long time period "$t_2$" after the wiper 85 returns to the initial position 88. On the other hand, when the wiper 85 has wiped out the windshield 84 at the low wiping speed and when the second comparator 400 outputs the logic level "0" second actuating signal, the flip-flop 61 outputs logic level "0" signal the short time period "$t_3$" after the wiper 85 goes from the initial position 88.) Accordingly, in spite of the high or low wiping speed, the time period defined between the time when the wiper 85 wipes out the rain sensor 100 and the time when the flip-flop 61 outputs the logic level "1" or "0" signal is always constant.

Further, when the one-shot circuit 31 of the actuator means 300 outputs the logic level "1" signal and the comparator 25 of the first comparator means 200 does not output the logic level "1" first actuating signal, the one-shot circuit 31 outputs the logic level "0" signal the certain time period after the one-shot circuit 31 outputs the logic level "1" pulse signal and the switching transistor 32 does not allow the electric current to pass therethrough.

As a result, the first switch 34 is turned from the position shown by the phantom line to the position shown by the solid line in FIG. 7, so that the wiper motor 801 is not driven. In this condition, the clear circuit 36 outputs a clear signal to each terminal "CL" of the flip flops 51, 61 or 71, so that the flip-flops 51, 61 and 71 are initiated.

Figure 9:
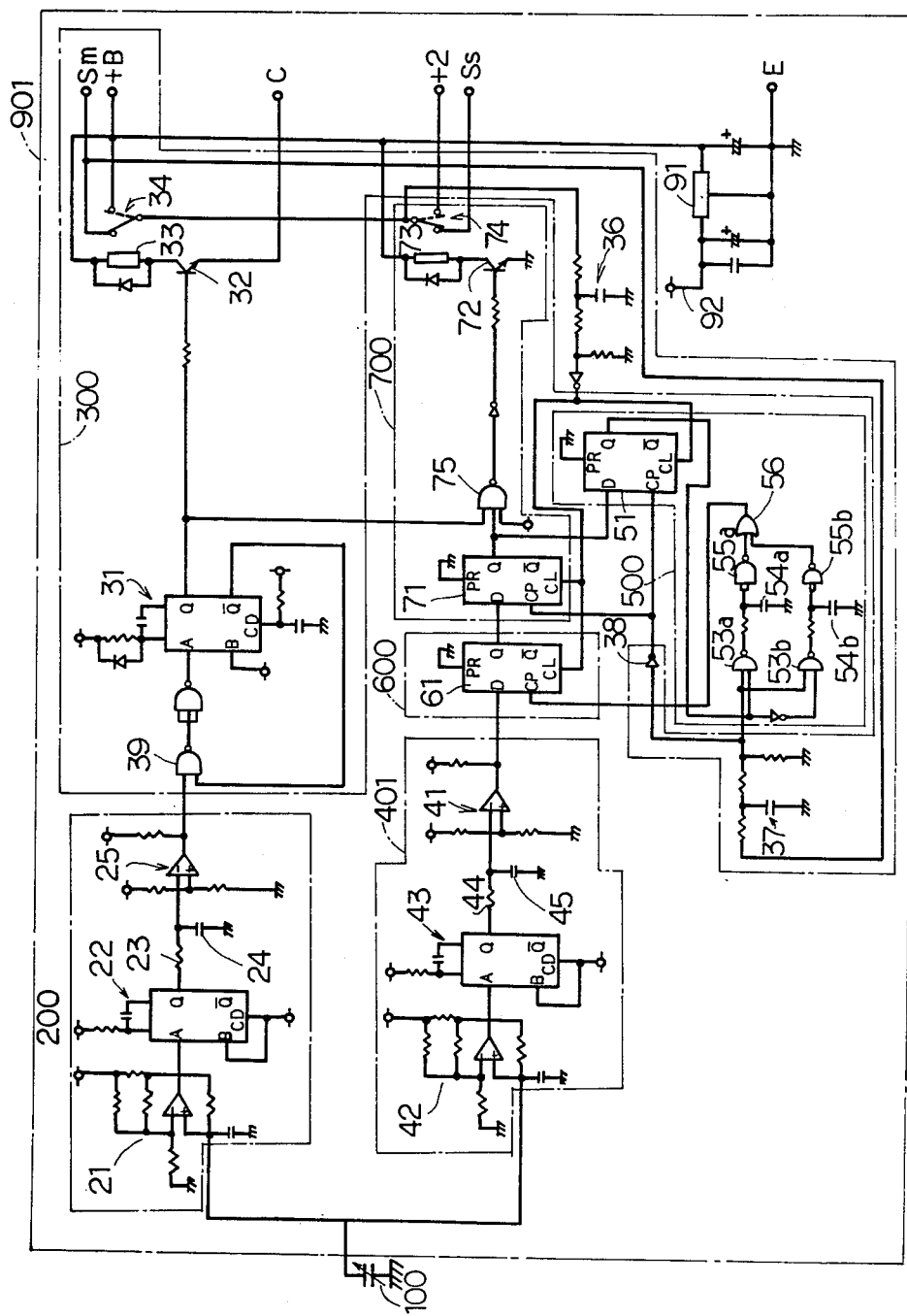
FIG. 9 is a schematic circuit illustrating a control circuit of a second embodiment of the present invention.

FIG. 9 shows a control circuit 901 of second embodiment according to the present invention. This second embodiment is very similar to the first embodiment described above. Differences between the first and second embodiments are that the control circuit 901 of the second embodiment includes a second comparator means 401 and that a rain sensor 100 is directly connected to the second comparator means 401.

Further, the second comparator means 401 includes an oscillator 42, one-shot circuit 43, a resistor 44, a condenser 45 and a comparator 41. The oscillator 42 is of a conventional resistor-condenser negative feedback type-oscillator which includes an operational amplifier as the outputting means of the oscillator. The oscillator 42 is connected to the rain sensor 100. When the rain sensor 100 varies its variable capacitance in proportion to amount of rain positioned on the rain sensor 100, the oscillator 42 outputs a frequency which varies in inverse proportion to amount of rain positioned on the rain sensor 100. The one-shot circuit 43 receives the output frequency and outputs a signal which has the same period as a period of the output frequency and which has a constant width regardless of the magnitude of the output frequency. An integration circuit, which consists of the resistor 44 and the condenser 45, receives the signal outputted from the one-shot circuit 43. The integration circuit outputs a voltage signal being in proportion to the output frequency outputted from the oscillator 42. Accordingly, the voltage signal is in inverse proportion to the detected amount of rain, as shown in FIG. 8(A). The comparator 41 receives the voltage signal and the comparator 41 compares the value of the voltage signal with a second predetermined value of voltage "$V_2$". When the comparator 41 determines the value of the voltage signal is equal to or less than the second predetermined value of voltage "$V_2$", the comparator 41 outputs the second actuating signal which has logic level "1", as shown in FIG. 8(C). The second predetermined value of voltage "$V_2$" corresponds to the large predetermined amount of drops of water. On the other hand, when the comparator 41 determines the value of the voltage signal is greater than the second predetermined value of voltage "$V_2$", the comparator 41 outputs the another actuating signal which has logic level "0". Only when the comparator means 401 determines the detected amount of rain is equal to or greater than the large predetermined amount of drops water, the comparator means 401 outputs the logic level "1" second actuating signal.

It is apparent to those skilled in the art that a timer means of a micro computer may be employed instead of the timer means 500 of the first embodiment and the micro computer may output the clock signal to the terminal "CL" of the flip-flop 61 of the memory means 600 when the micro computer counts down the long or short time period after the wiper 85 returns to the initial position 88 of the wiper 85 (e.g., the micro computer counts down the long time period "$t_2$" when the wiper 85 had returned to the initial position 88 at the high wiping speed, and when the micro computer counts down "Zero", the memory means 600 outputs the logic level "1" or logic level "0" signal, on the other hand, when the wiper 85 had returned to the initial position 88 at the low wiping speed, the micro computer counts down the short time period "$t_3$" and when the micro computer count down "Zero", the memory means 600 outputs the logic level "1" or logic level "0" signal.)

Further, it is also apparent to those skilled in the art that the inverter 55a or 55b of the timer means 500 may output the logic level "0" clock signal through the OR gate 56 when the wiper 85 goes from the initial position 88 instead when the wiper 85 returns to the initial position 88.

As described herein, the present invention overcomes the shortcomings of the known art or the privately proposed art by providing an apparatus for controlling wipers which detects the amount of rain positioned on a rain sensor regardless of the wiping speed of wipers and moves smoothly the wipers at different wiping speeds in accordance with the detected amount of rain.

While the present invention has been described in its preferred embodiments, it is to be understood that the invention is not limited thereto, and may be otherwise embodied within the scope of the following claims.

What is claimed is:

1. An apparatus for controlling a wiper comprising:
    a detecting means for detecting an amount of rain positioned thereon, said detecting means outputting a detected rain signal, the detected rain signal corresponding to the detected amount of rain positioned on said detecting means after the wiper wipes out water deposited on said detecting means;
    a first comparator means for comparing the detected rain signal with a first predetermined signal, the first predetermined signal corresponding to a first predetermined amount of drops of water, said first comparator means determining if the detected amount of rain is equal to or greater than the first predetermined amount of drops of water, wherein when said first comparator means determines the detected amount of rain is equal to or greater than the first predetermined amount of drops of water, said first comparator means outputs a first output signal;
    an actuator means for actuating the wiper in accordance with receipt of the first output signal so that when said actuator means receives the first output signal, said actuator means produces an actuating output signal and actuates the wiper at a first wiping speed;

a second comparator means for comparing the detected rain signal with a second predetermined signal, the second predetermined signal corresponding to a second predetermined amount of drops of water, said second comparator means determining if the detected amount of rain is equal to or greater than the second predetermined amount of drops of water, wherein when said second comparator means determines the detected amount of rain is equal to or greater than the second predetermined amount of drops of water, said second comparator means produces a second output signal;

a timer means for receiving the actuating output signal outputted from the actuator means, and for producing a first clock signal when the wiper returns to an initial position, the first clock signal having a first time period, said timer means receiving a change output signal, and producing a second clock signal having a second time period;

a memory means for receiving said second output signal and the first and second clock signals and for memorizing said second output signal, said memory means reproducing said memorized second output signal during the first time period after the wiper wipes out the water deposited onsaid detecting means in accordance with receipt of the first clock signal, said memory means reproducing said memorized second output signal during the second time period after the wiper wipes out the water deposited on said detecting means in accordance with receipt of the second clock signal; and a changing means for receiving the memorized second output signal and for producing the change output signal for changing the wiping speed of the wiper at a time when the wiper returns to the initial position thereof in accordance with receipt of the memorized second output signal reproduced from the memory means.

2. An apparatus of claim 1, wherein said detecting means is located on an external surface of the windshield, the wiper wiping out the water deposited on said detecting means.

3. An apparatus of claim 1, wherein said first comparator means comprises a comparator, a one-shot circuit, an oscillator and an integration circuit, said comparator being electrically connected to said integration circuit, said integration circuit being electrically connected to said one-shot circuit and said one-shot circuit being electrically connected to said oscillator.

4. An apparatus of claim 1, wherein said actuator means comprises a one-shot circuit, a NAND gate, a switching transistor, a relay and a switch, said NAND gate being electrically connected to said one-shot circuit, said one-shot circuit being electrically connected to said switching transistor said switching transistor being electrically connected to said relay and said switch being turned on in accordance with actuation of said relay.

5. An apparatus of claim 1, wherein said timer means comprises a flip-flop, two NAND gates, two condensers, two inverters and an OR gate, said flip-flop being electrically connected to said two NAND gates, each of said NAND gates being electrically connected to one of said two condensers and one of said two inverters and said two inverters being electrically connected to said OR gate.

6. An apparatus of claim 1, wherein said changing means comprises a flip-flop, a NAND gate, a switching transistor, a relay and a switch, said flip-flop being electrically connected to said NAND gate, said NAND gate being electrically connected to said switching transistor, said switching transistor being electrically connected to said relay and said switch being turned on in accordance with actuation of said relay.

7. The apparatus of claim 1, wherein said first comparator means outputs a third output signal when said first comparator means determines the detected amount of rain is less than the first predetermined amount of drops of water.

8. The apparatus of claim 1, wherein said second comparator means output a fourth output signal when said second comparator means determines the detected amount of rain is less than the second predetermined amount of drops of water.

9. The apparatus of claim 1, wherein when the wiper moves from and returns to the initial position at the high wiping speed, said timer means outputs the second clock signal during a second time period, and when the wiper moves from and returns to the initial position at the low wiping speed, said timer means outputs the first clock signal during a first time period.

10. An apparatus for controlling a wiper comprising:

a detecting means for detecting an amount of rain positioned thereon, the wiper wiping out water deposited on said detecting means, the wiper moving from and returning to an initial position, said detecting means being located in the vicinity of an apex of movement of the wiper, said detecting means outputting a detected rain signal, the detected rain signal corresponding to the detected amount of rain positioned on said detecting means after the wiper wipes out water deposited on said detecting means;

a first comparator means for comparing the detected, rain signal with a first predetermined signal, the first predetermined signal corresponding to a first predetermined amount of drops of water, said first comparator means determining if the detected amount of rain is equal to or greater than the first predetermined amount of drops of water, said first comparator means producing a first output signal, the first output signal having selectively a first logic level or a second logic level, whereby when said first comparator means determines the detected amount of rain is equal to or greater than the first predetermined amount of drops of water, the first output signal has the first logic level, and when the first comparator means determines the detected amount of rain is less than the first predetermined amount of drops of water, the first output signal has the second logic level;

an actuator means, connected to said first comparator means, for producing an actuating output signal and actuating the wiper at a first wiping speed from an initial position of the wiper when the first output singal has the first logic level;

a second comparator means for comparing the detected rain signal with a second predetermined signal, the second predetermined signal corresponding to a second predetermined amount of drops of water, said second comparator means determining if the detected amount of rain is equal to or greater than the second predetermined amount of drops of water, said second comparator means produces a second output signal, said second output signal having selectively the first logic level or the second logic level, whereby the second output signal has the first logic level when said second comparator means determines that the detected amount of rain is equal to or greater than the second predetermined amount of drops of water, and when said second comparator means determines the detected amount of rain is less than the second predetermined amount of drops of water, said second comparator means produces the second output signal which has the second logic level;

a timer means for receiving the actuating output signal, and for producing a first clock signal when the wiper returns to the initial position, the first clock signal having a first time period, said timer means receiving a change output signal, and producing a second clock signal when the wiper returns to the initial portion, the second clock signal having a second time period;

a memory means for receiving said second output signal and the first and second clock signals and for memorizing said second output signal, said memory means reproducing said memorized second output signal during the first time period after the wiper wipes out the water deposited on said detecting means in accordance with receipt of the first clock signal, said memory means reproducing said memorized second output signal during the second time period after the wiper wipes out the water deposited on said detecting means in accordance with the receipt of the second clock signal; and a changing means for receiving the memorized second output signal and for producing the change output signal for changing the wiping speed of the wiper at a time when the wiper returns to the initial position thereof in accordance with receipt of the memorized second output signal reproduced from the memory means.

11. An apparatus of claim 10, wherein said timer means comprises a flip-flop, two NAND gates, two condensers, two inverters and an OR gate, said flip-flop being electrically connected to one of said two condensers and one of said two inverters, said two inverters being electrically connected to said OR gate.

12. An apparatus of claim 10, wherein said first comparator means comprises a comparator, a one-shot circuit, an oscillator and an integration circuit, said comparator being electrically connected to said integration circuit, said integration circuit being electrically connected to said one-shot circuit, said one-shot circuit being electrically connected to said oscillator.

13. An apparatus of claim 10, wherein said actuator means comprises a one-shot circuit, a NAND gate, a switching transistor, a relay and a switch; said NAND gate being electrically connected to said one-shot circuit, said one-shot circuit being electrically connected to said switching transistor, said switching transistor being electrically connected to said relay, said switch being turned on in accordance with actuation of said relay.

14. An apparatus of claim 10, wherein said changing means comprises a flip-flop, a NAND gate, a switching transistor, a relay and a switch said flip-flop being electrically connected to said NAND gate, said NAND gate being electrically connected to said switching transistor, said switching transistor being electrically connected to said relay, said switch being turned on in accordance with actuation of said relay.

15. An apparatus for controlling a wiper comprising:

a detecting means for detecting an amount of rain positioned thereon, said detecting means being located on a windshield, the wiper wiping out water deposited on said detecting means, and moving from and returning to an initial position, said detecting means outputting a detected rain signal, the detected rain signal corresponding to the detected amount of rain positioned on said detecting means after the wiper wipes out water deposited on said detecting means;

a first comparator means for comparing the detected rain signal with a first predetermined signal, the first predetermined signal corresponding to a first predetermined amount of drops of water, said first comparator means determining if the detected amount of rain is equal to or greater than the first predetermined amount of drops of water, so that when said first comparator means determines the detected amount of rain is equal to or greater than the first predetermined amount of drops of water, said first comparator means produces a first output signal;

an actuator means, said actuator means being connected to said first comparator means for actuating the wiper in accordance with receipt of the first output signal produced by said first comparator means, so that when said actuator means receives the first output signal, said actuator means produces an actuating output signal and actuates the wiper at a first wiping speed starting from an initial position of the wiper;

a position detecting means for detecting the position of the wiper and for producing a position signal when the wiper is positioned at the initial position;

a second comparator means for comparing the detected rain signal with a second predetermined signal, the second predetermined signal corresponding to a second predetermined amount of drops of water, said second comparator means determining if the detected amount of rain is equal to or greater than the second predetermined amount of drops of water, so that when said second comparator means determines the detected amount of rain is equal to or greater than the second predetermined amount of drops of water, said second comparator means produces a second output signal;

a timer means for receiving the actuating output signal, and for producing a first clock signal so that when the position detecting means produces the position signal, the first clock signal is produced, the first clock signal having a first time period, said timer means receiving a change output signal, and producing a second clock signal when the wiper returns to the initial portion, the second clock signal having a second time period;

a memory means for receiving said second output signal and the first and second clock signals and for memorizing the second output signal, said memory means reproducing said memorized second output signal during the first time period after the wiper wipes out the water deposited on said detecting means in accordance with receipt of the first clock signal, said memory means reproducing said memorized second output signal during the second time period after the wiper wipes out the water deposited on said detecting means in accordance with receipt of the second clock signal; and a changing means for receiving the memorized second output signal and for producing the change output signal for changing the wiping speed of the wiper at a time when the position detecting means produces the position signal in accordance with receipt of the memorized second output signal reproduced by the memory means.

16. An apparatus of claim 15, wherein said timer means comprises a flip-flop, two NAND gates, two condensers, two inverters and an OR gate, said flip-flop being electrically connected to said two NAND gates, each NAND gate being electrically connected to one of said two condensers and one of said two inverters, said two inverters being electrically connected to said OR gate.

17. An apparatus of claim 15, wherein said changing means comprises a flip-flop, a NAND gate, a switching transistor, a relay and a switch, said flip-flop being electrically connected to said NAND gate, said NAND gate being electrically connected to said switching transistor, said switching transistor being electrically connected to said relay, said switch being turned on in accordance with actuation of said relay.

18. An apparatus of claim 15, wherein said actuator means comprises a one-shot circuit, a NAND gate, a switching transistor, a relay and a switch, said NAND gate being electrically connected to said one-shot circuit, said one-shot circuit being electrically connected to said switching transistor, said switching transistor being electrically connected to said relay, and said switch being turned on in accordance with actuation of said relay.

19. A method for controlling a wiper comprising:
detecting an amount of rain positioned on a detecting means, said detecting means being located on a windshield, the wiper wiping out water deposited on said detecting means and moving from and returning to an initial position, said detecting means outputting a detected rain signal, the detected rain signal corresponding to the detected amount of rain positioned on said detecting means after the wiper wipes out water deposited on said detecting means;

comparing the detected rain signal with a first predetermined signal, the first predetermined signal corresponding to a first predetermined amount of drops of water;

producing a first output signal when the detected amount of rain is equal to or greater than the first predetermined amount of drops of water;

producing an actuating signal and actuating the wiper at a first wiping speed in accordance with receipt of the first output signal;

comparing the detected rain signal with a second predetermined signal, the second predetermined signal corresponding to a second predetermined amount of drops of water;

producing a second output signal when the detected amount of rain is equal to or greater than the second predetermined amount of drops of water;

producing first and second clock signals when the wiper is in said initial position, the first clock signal having a first time period and the second clock signal having a second time period;

memorizing the second output signal;

reproducing the memorized second output signal during the first time period after the wiper wipes out the water deposited on said detecting means in accordance with receipt of the first clock signal, or during the second time period after the wiper wipes out the water deposited on said detecting means in accordance with receipt of the second clock signal; and producing a change output signal for changing the wiping speed of the wiper at a time when the wiper returns to the initial position thereof in accordance with receipt of the memorized second output signal.

20. A method of claim 19, further comprising the steps of detecting the position of the wiper; and
producing a position signal when the wiper is positioned at the initial position.

* * * * *